(12) United States Patent
Price et al.

(10) Patent No.: US 11,642,589 B2
(45) Date of Patent: May 9, 2023

(54) VIRTUAL-PROJECTILE DELIVERY IN AN EXPANSIVE ENVIRONMENT

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US); Mark Anthony Plagge, Sammamish, WA (US); Melissa Arde Lobb, Bellevue, WA (US); Mikael Froejk Figueroa, Carnation, WA (US); Jonathan Gustav Paulovich, Redmond, WA (US); Evan Gregory Levine, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 16/937,457

(22) Filed: Jul. 23, 2020

(65) Prior Publication Data

US 2022/0023752 A1 Jan. 27, 2022

(51) Int. Cl.
*A63F 13/211* (2014.01)
*A63F 13/216* (2014.01)
(Continued)

(52) U.S. Cl.
CPC .......... *A63F 13/216* (2014.09); *A63F 13/211* (2014.09); *A63F 13/213* (2014.09);
(Continued)

(58) Field of Classification Search
CPC .... A63F 13/216; A63F 13/211; A63F 13/213; A63F 13/245; A63F 13/837;
(Continued)

(56) References Cited

U.S. PATENT DOCUMENTS 6,509,896 B1 * 1/2003 Saikawa ............... A63F 13/426
345/419
2007/0265088 A1 * 11/2007 Nakada ................ A63F 13/04
463/37

(Continued)

FOREIGN PATENT DOCUMENTS

| CN | 105413177 A | 3/2016 |
| EP | 1908504 A1 | 4/2008 |
| EP | 3168776 A1 | 5/2017 |

OTHER PUBLICATIONS

"International Search Report and Written Opinion Issued in PCT Application No. PCT/US2021/032264", dated Oct. 13, 2021, 19 Pages.

(Continued)

*Primary Examiner* — David L Lewis
*Assistant Examiner* — Shauna-Kay Hall
(74) *Attorney, Agent, or Firm* — Alleman Hall Creasman & Tuttle LLP

(57) ABSTRACT

One method comprises receiving a hit signal from a device worn by a first player, receiving a position of the device, receiving an orientation of a launch axis of a virtual-projectile launcher, receiving a position of a second player, and outputting a hit assignment on determining, pursuant to receiving the hit signal, that a recognized object and the second player are coincident at an indicated launch of a virtual projectile. Another method comprises receiving an indication of launch of a virtual projectile by a virtual-projectile launcher of a first player, receiving an image aligned to a launch axis of the virtual-projectile launcher, outputting a hit signal to a server on determining, pursuant to receiving the indication of launch, that a recognized (Continued)

object is imaged in a projectile-delivery area of the image, and outputting a position of the device and an orientation of the launch axis to the server.

20 Claims, 8 Drawing Sheets

(51) Int. Cl.
*A63F 13/213* (2014.01)
*A63F 13/245* (2014.01)
*A63F 13/837* (2014.01)
*G01S 19/03* (2010.01)
*G06F 3/01* (2006.01)

(52) U.S. Cl.
CPC .......... *A63F 13/245* (2014.09); *A63F 13/837* (2014.09); *G01S 19/03* (2013.01); *G06F 3/011* (2013.01); *A63F 2300/105* (2013.01); *A63F 2300/1043* (2013.01); *A63F 2300/1062* (2013.01); *A63F 2300/1087* (2013.01); *A63F 2300/8076* (2013.01)

(58) Field of Classification Search
CPC ........ A63F 2300/1043; A63F 2300/105; A63F 2300/1062; A63F 2300/1087; A63F 2300/8076

See application file for complete search history.

(56) References Cited

U.S. PATENT DOCUMENTS

| | | | |
|---|---|---|---|
| 2012/0058823 A1* | 3/2012 | Minato | A63F 13/5252 463/32 |
| 2014/0287806 A1 | 9/2014 | Balachandreswaran | |
| 2016/0259404 A1* | 9/2016 | Woods | G06T 19/006 |
| 2016/0292924 A1 | 10/2016 | Balachandreswaran et al. | |
| 2017/0168556 A1* | 6/2017 | Goslin | A63F 13/428 |
| 2019/0134487 A1* | 5/2019 | Kudirka | A63F 13/213 |
| 2019/0155384 A1* | 5/2019 | Fajt | A63F 13/212 |
| 2019/0374857 A1* | 12/2019 | Deller | G06T 13/40 |
| 2021/0106914 A1* | 4/2021 | Fan | A63F 13/58 |

OTHER PUBLICATIONS

"Invitation to Pay Additional Fee Issued in PCT Application No. PCT/US2021/032264", dated Aug. 18, 2021, 13 Pages.

* cited by examiner

VIRTUAL-PROJECTILE DELIVERY IN AN EXPANSIVE ENVIRONMENT

BACKGROUND

Some of the most impressive applications of computer technology are in field of interactive gaming. Interactive, state-of-the-art game systems leverage recent innovations in virtual reality and high-bandwidth networking to create immersive, lifelike experiences. However, state of the art interactive game systems have traditionally operated in controlled and predictable environments, where the required sensory functions are relatively easy to manage. In more expansive environments it can be challenging to provide the required sensory functions at the required level of accuracy.

SUMMARY

One aspect of this disclosure relates to a server-implemented method to support an experience wherein a virtual projectile is launched by a virtual-projectile launcher of a first player. The method comprises receiving a hit signal from a device worn by the first player, the device being configured to output the hit signal on determining, pursuant to receiving an indication of launch of the virtual projectile, that a recognized object is imaged in a projectile-delivery area. The method further comprises receiving a position of the device, receiving an orientation of a launch axis of the virtual-projectile launcher, receiving a position of a second player, and outputting a hit assignment on determining, pursuant to receiving the hit signal, that the recognized object and the second player are coincident at the indicated launch of the virtual projectile.

Another aspect of this disclosure relates to a method enacted on a device worn by a first player. The method comprises receiving an indication of launch of a virtual projectile by a virtual-projectile launcher of the first player, receiving an image aligned to a launch axis of the virtual-projectile launcher, outputting a hit signal to a server on determining, pursuant to receiving the indication of launch, that a recognized object is imaged in a projectile-delivery area of the image, outputting a position of the device to the server, and outputting an orientation of the launch axis to the server.

Another aspect of this disclosure relates to a device to be worn by a first player. The device comprises a computer coupled operatively to a wireless transmitter and wireless receiver. The computer is configured to receive an indication of launch of a virtual projectile by a virtual-projectile launcher of the first player, receive an image aligned to a launch axis of the virtual-projectile launcher, determine whether a recognized object is imaged in a projectile-delivery area of the image, output a hit signal to a server on determining, pursuant to receiving the indication of launch, that the recognized object is imaged in the projectile-delivery area of the image, output a position of the device to the server, and output an orientation of the launch axis to the server.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

This disclosure presents supporting technology for a genus of immersive, interactive game experiences. The feature common to the genus is delivery of a virtual projectile from a first player to a second player. The game players wear devices that report their positions to a network service and also report the orientation of the launch axes for virtual projectiles launched by a player. The network service tracks player positions and, in principle, determines whether a given player is virtually hit by or otherwise virtually receives a virtual projectile based on the positions of the two players and the orientation of the launch axis. That method for assigning a 'hit' (i.e., delivery of a virtual projectile) is well-suited to game environments up to a certain size, where the trajectory of the virtual projectile can be extrapolated with sufficient accuracy. In more expansive environments, however, where the players are spaced farther apart, extrapolation error may adversely affect the game experience. Moreover, for systems that use simultaneous location and mapping (SLAM) for position or orientation sensing, unpredictable lighting conditions in outdoor and other less controlled environments may further degrade the extrapolation accuracy.

In view of these issues, a modified approach may be used to assign virtual-projectile hits in more expansive (e.g., outdoor) environments. Here the task of determining that a given player has received a virtual projectile is shared between the network service that maintains the player mapping and the game devices worn by the players. More specifically, a game device of the projectile-launching first player processes a target image acquired at the time of launch to determine whether any recognized object has been hit. After determining that a recognized object has been hit, the game device communicates its position and the orientation of the launch axis to the network service. On receiving that information, the network service uses the mapped player positions to determine which player is most likely to have been hit. This modified approach is applicable to a wide range of games, including shooting games, where the device used to launch the virtual projectile is equipped with a rigidly mounted camera and tasked with acquiring the target image.

Figure 1:
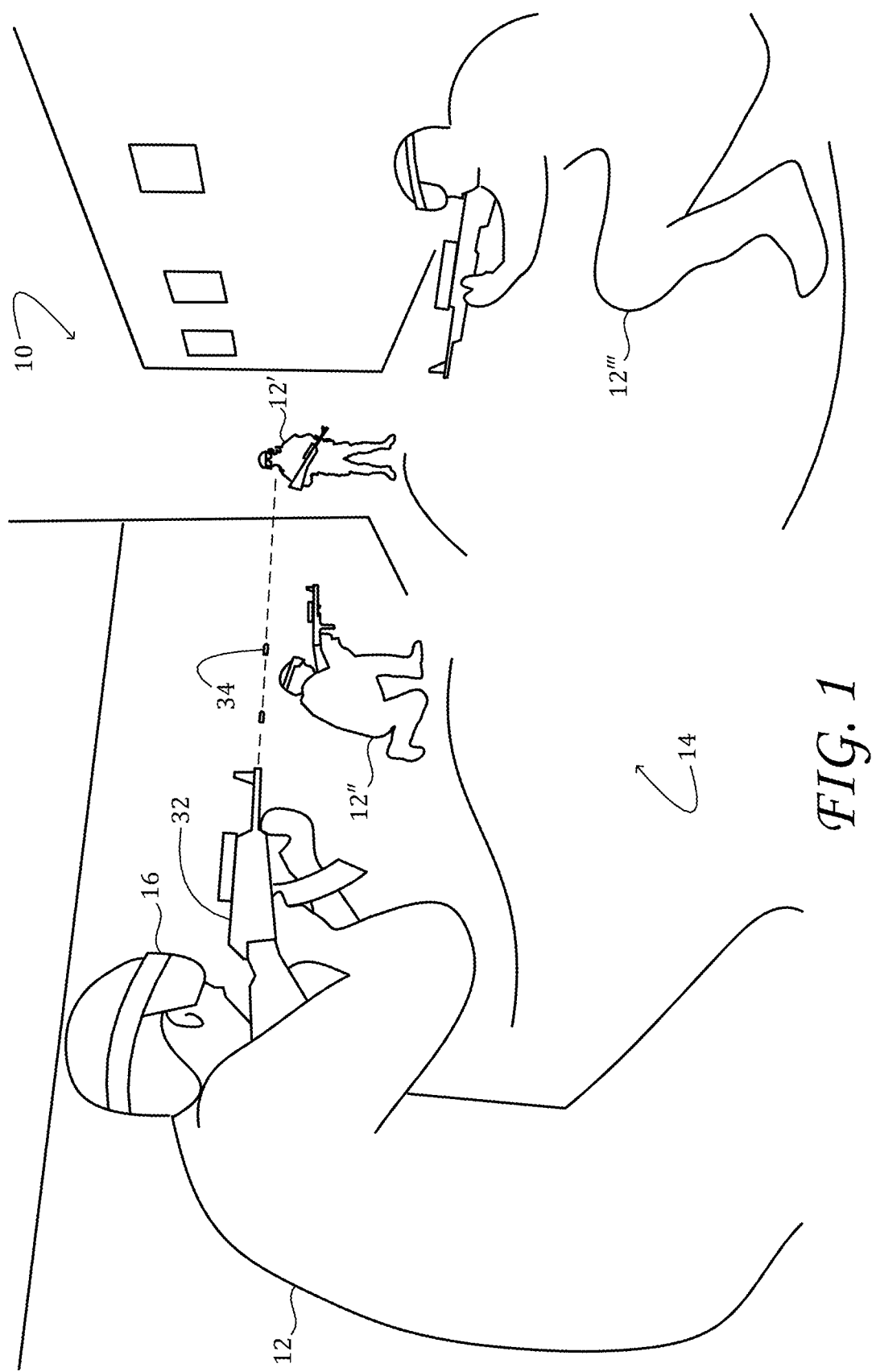
FIG. 1 shows aspects of an example game environment.

Turning now to the drawings, FIG. 1 shows aspects of an example real-world environment 10. A plurality of game players 12 (viz., 12, 12', 12", and 12''') are situated in the environment and engaged in a game 14. In the illustrated example, environment 10 is an expansive, outdoor environment in which the players can move freely. The systems and methods herein may also be used in indoor environments of any configuration, including multi-level buildings. Environment 10 may include real-world physical features such as buildings, even or uneven terrain, and various other geographic features. In some examples, the real-world features of the environment may be elements of game 14.

Any, some, or each of the game players 12 in environment 10 may participate in game 14 via a game device 16. In FIG. 1 each player is shown with a corresponding game device. In other examples, a game device for every player in the game may not be necessary. As described hereinafter, game device 16 provides functionality that enables game player 12 to participate in game 14. To achieve that functionality, the game device and the game player are co-located and, in some examples, co-located in a fixed relative orientation. To that end, game device 16 may be worn by the corresponding game player 12. The game device may be affixed to the player's wrist, head, or other body part via a band or strap, for instance. In other examples, the game device 16 may be carried, held, driven (if a vehicle) or otherwise predictably co-located relative to the game player.

Figure 2:
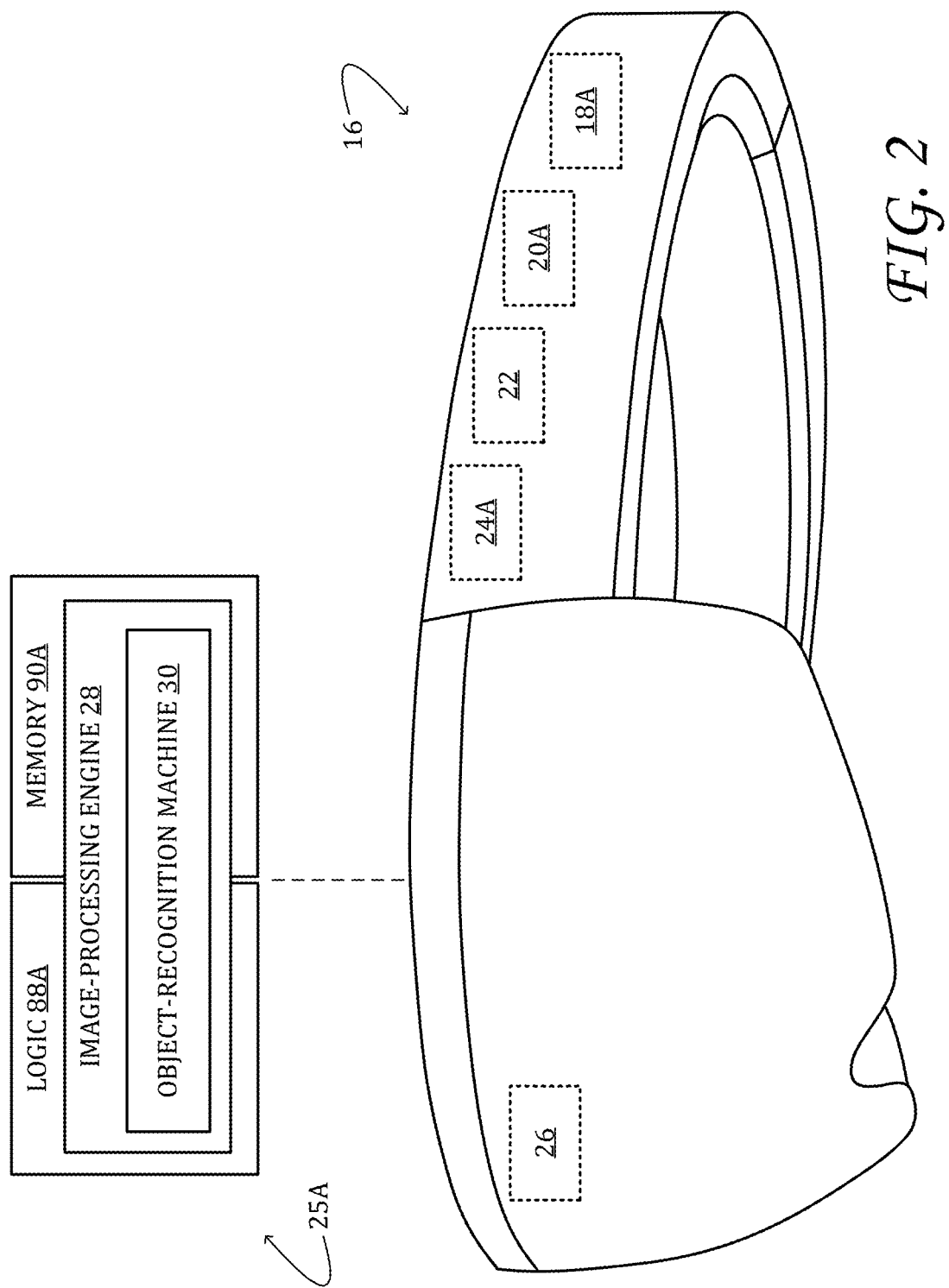
FIG. 2 shows aspects of an example game device.

FIG. 2 shows additional aspects of game device 16 in one, non-limiting example. Game device 16 of FIG. 2 includes a wireless transmitter 18A and a wireless receiver 20A. The wireless transmitter and wireless receiver communicatively couple game device 16 to one or more remote devices, such as a peripheral device or network server. In the illustrated example, game device 16 includes a position sensor 22. The position sensor is configured to sense the position of the game device in environment 10 and may comprise any absolute or relative position-sensing componentry, such as a global positioning-system (GPS) receiver, WiFi location sensor, magnetic position sensor, etc. The game device may also include an orientation sensor 24A configured to sense the absolute or relative orientation of the game device. The orientation sensor may comprise an inertial-measurement unit (IMU, including an accelerometer, gyroscope, and/or electronic compass), a GPS receiver, and/or any other orientation-sensing component. In game device 16, wireless transmitter 18A, wireless receiver 20A, and position sensor 22, inter alia, are coupled operatively to computer 25A. Additional aspects of computer 25A are described further below.

In FIG. 1, game device 16 takes the form of an augmented-reality display device worn on the head of game player 12. In that example, the game device may superpose virtual display imagery into the field of view of the game player. The virtual display imagery may provide data and/or messaging and may otherwise enhance the game experience for game player 12. For instance, the virtual display imagery may augment the game player's perception of environment 10 and/or other game players. In a futuristic battle game, the virtual display imagery may be used to impart an other-worldly appearance to the environment, for example.

The illustrated game device 16 includes an outward-imaging game-device camera 26 such as a color camera, a monochrome camera, a thermal-imaging camera, a depth camera, or any combination thereof. The game device may also include an inward-imaging camera configured to resolve the pupil positions of player 12 and thereby enable gaze tracking. Game device 16 also includes an image-processing engine 28. In some examples, the image-processing engine may be configured to receive digital image data acquired by the game-device camera. The image-processing engine may support various kinds of image processing, such as SLAM, which may be used to compute the position and/or orientation of game device 16, as an alternative or supplement to position sensor 22 or orientation sensor 24A. To support SLAM and/or other functionality, image processing engine 28 includes an object-recognition machine 30. The object-recognition machine is configured to receive an image and to recognize and locate one or more predetermined object types appearing in the image. Recognized object types may include buildings, stationary targets such as a bullseye or goal post, and/or moving targets such as animals or human beings, for example. In some examples, object-recognition machine 30 may employ a previously trained convolutional neural network (CNN) or other machine-learning model.

Significantly, the image submitted to object-recognition machine 30 need not be acquired by game-device camera 26. In some examples, the image submitted to the object-recognition machine may be acquired by a camera of a communicatively coupled peripheral device and transmitted to game device 16 for processing. Accordingly, game device 16 maybe one of a plurality of devices used by a given game-player 12 to participate in game 14. Such devices may also include, as shown in FIG. 1, peripheral device 32.

This disclosure embraces a wide range of game experiences in which a game player launches one or more virtual projectiles, attempting to hit a target. In some examples, peripheral device 32 embodies a virtual-projectile launcher. For instance, in battle-simulation game 14 of FIG. 1, game player 12 launches virtual projectiles 34 by pulling the trigger of peripheral device 32. Here the peripheral device takes the form of a rifle—e.g., a simulated rifle or actual rifle configured to operate in a training mode where each trigger pull launches virtual bullets in lieu of lethal bullets. In other shooting games, peripheral device 32 may take the form of a handgun, shotgun, or laser gun; virtual projectiles 34 may comprise virtual bullets, slugs, darts, or wave packets. In other shooting games, peripheral device 32 may take the form of a bow, and virtual projectiles 34 may comprise virtual arrows launched from the bow. In sports games, peripheral device 32 may take the form of a sports implement, such as a virtual golf club; virtual projectiles 34 may comprise virtual golf balls. Naturally, the examples noted herein are not intended to be exhaustive.

Figure 3:
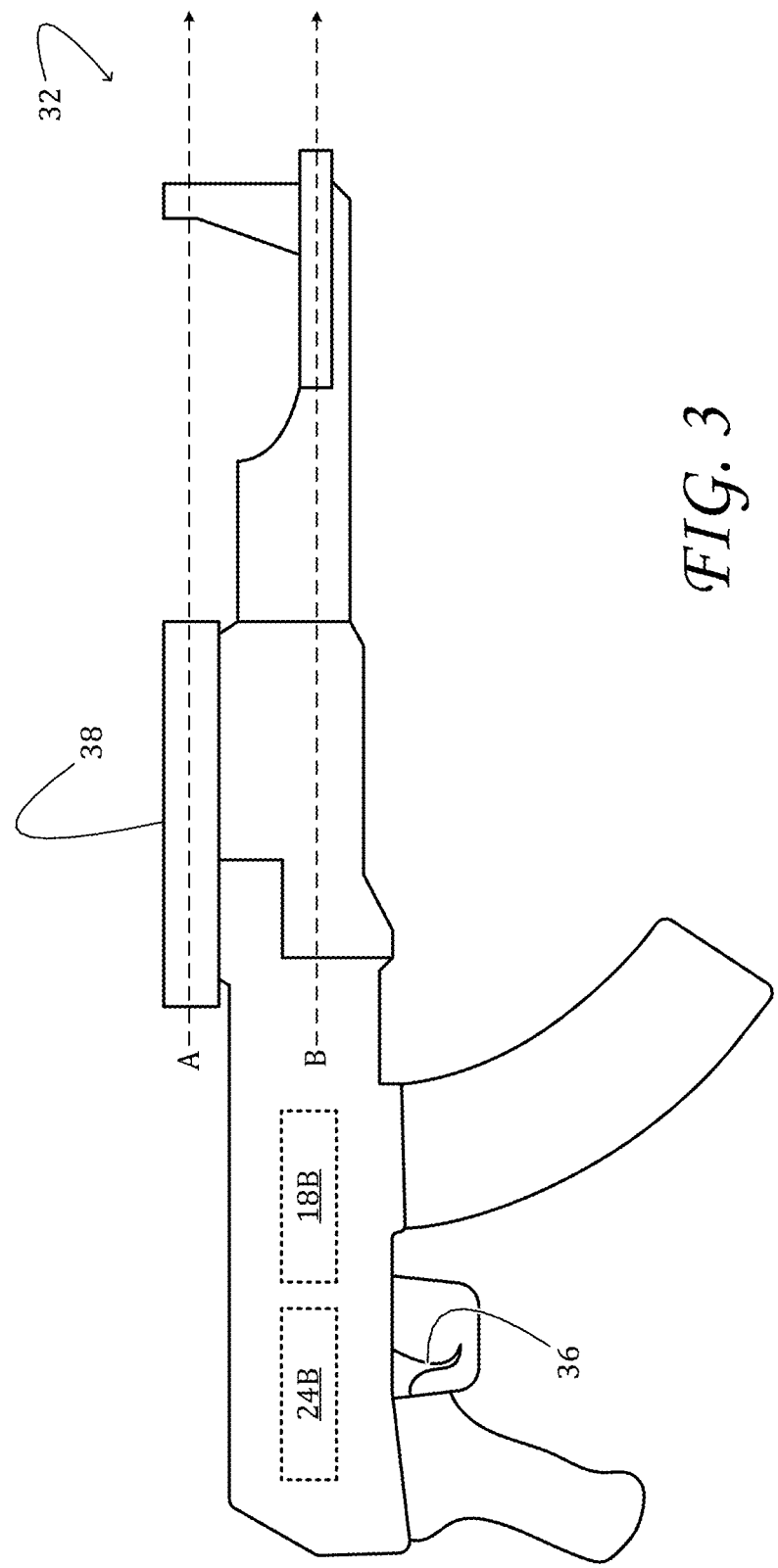
FIG. 3 shows aspects of an example peripheral device.

FIG. 3 shows additional aspects of peripheral device 32 in one, non-limiting example. The peripheral device includes a wireless transmitter 18B that communicatively couples the peripheral device to game device 16. The peripheral device also includes an orientation sensor 24B. In some examples, the orientation sensor is configured to sense the absolute orientation of the peripheral device. In other examples, the orientation sensor is configured to sense the orientation of the peripheral device relative to communicatively coupled game device 16. The orientation sensor may comprise an IMU (including an accelerometer, gyroscope, and/or electronic compass), a GPS receiver, and/or any other orientation sensing component. In examples in which an IMU is used, the IMU optionally may be configured for three degrees-of-freedom (3DOF, rotation-only) tracking.

Peripheral device 32 includes a trigger 36 and associated event-handling logic that executes when the trigger is pulled or otherwise actuated. The event-handling logic interfaces with wireless transmitter 18B and causes the wireless transmitter to transmit an indication of launch of a virtual projectile 34. The indication of launch is received by wireless receiver 20A of communicatively coupled game device 16.

Peripheral device 32 includes a rigidly mounted peripheral-device camera 38. In the illustrated example, the peripheral-device camera shares its optical axis A with a rifle scope that game player 12 may look through to view a targeted object. The targeted object may appear behind a reticle, for instance. In this configuration, the reticle image acquired by the peripheral-device camera is naturally aligned with and parallel to the launch axis (e.g., the longitudinal axis) B of peripheral device 32. In some examples the peripheral-device camera may include a thermal-imaging camera. The peripheral device may be configured, via wireless transmitter 18B and appropriate control logic, to transmit the image acquired by peripheral-device camera 38 to game device 16, for processing in image-processing engine 28 of the game device. In particular, object-recognition machine 30 of the image-processing engine may enact object recognition on the image received from the peripheral device. In some examples, recognition of reference objects in environment 10 in the image acquired by peripheral-device camera 38 may be used in a SLAM function to determine the absolute orientation of the peripheral device in the environment. In some examples, absolute orientation data from SLAM, a GPS receiver, or the like, may be used to refine 3DOF orientation data from orientation sensor 24B via a sensor-fusion approach. Object-recognition may also be used to recognize and locate within the image a target object of one or more predefined object classes. Further, the object-recognition engine may indicate when a recognized object is imaged within a predetermined projectile-delivery area of the image and provide other functionality, as described further below.

Despite these advantages, peripheral-device camera 38 may not be necessary for all games that employ a peripheral device. In some games, a passive implement or the hand or foot of game player 12 may serve as a virtual-projectile launcher, rather than the peripheral device itself. In a battle-simulation game, for instance, a virtual grenade or virtual knife may be launched from the player's hand. Likewise, in various sports games a virtual projectile in the form of a ball, disc, or other game object may be launched from the game player's hand, foot, or passive sports implement. In these examples, a wrist-worn, ankle-worn, or implement-attached peripheral device comprising an inertial sensor and wireless transmitter may sense and communicate the data relevant to the launch of a virtual projectile. In still other examples, game device 16 may itself provide the imaging and/or sensing relevant to the launch (e.g., via video analysis with an appropriately trained machine learning model).

In some examples, game 14 is further supported by a network service. As illustrated schematically in FIG. 4, network service 40 includes a mapping engine 42 that maintains the overall state of the game by mapping the position of each of the game players 12 in environment 10. The network service also includes an orientation-tracking engine 44 that tracks the launch-axis orientations of the peripheral devices 32 associated with the game players. The launch-axis orientations may be used in the network service to compute kinematic compensations based on the vector-valued velocities of the virtual projectiles and to determine which players have been targeted. The network service also includes a hit-assignment engine 46 that determines whether any game player, or other target, receives a virtual projectile launched by another game player. These and other engines operating on the network service may be configured to receive output from any, some, or all of the game devices 16 of the game players. As described further below, that output may include the position of each player, the orientation of each player's virtual-projectile launcher, and an indication of whether a recognized object is imaged within a projectile-delivery area at the point at which a virtual projectile is launched. The network service may also receive additional information from the game devices, as described hereinafter.

Figure 4:
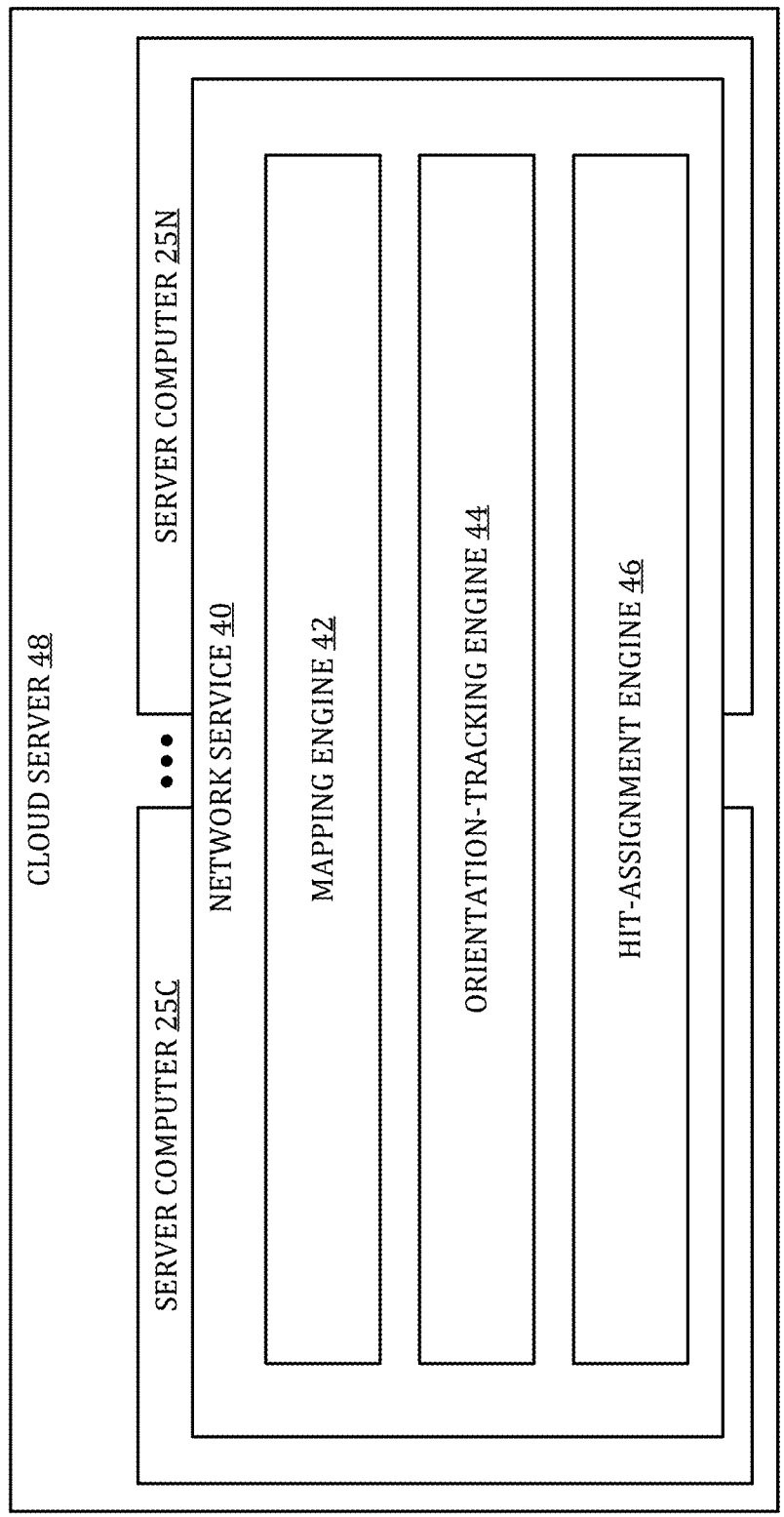
FIG. 4 shows aspects of an example network service.

Network service 40 of FIG. 4 is executed on a cloud server 48 remote from environment 10. The cloud server includes one or more remote server computers 25C through 25N. In other examples, the cloud server may execute on an edge server situated in proximity to one or more game devices 16 in environment 10. In still other examples, the network service may be distributed among a plurality of computer devices located within the environment, such as the game devices 16 of game players 12. In that manner, different portions of network service 40 may execute in parallel on the game devices worn by the players. Such portions may be marshaled by a controller device, in some examples, or may execute a strictly peer-to-peer protocol in other examples.

Hit signals, hit assignments, and position and orientation data may be represented by any suitable digital data structure and may be communicated between network service 40 and game devices 16 in any suitable manner. In some non-limiting examples, the data may be strongly typed and transmitted in the form of datagram and/or TCP packets. Likewise, a trigger signal or other indication of virtual projectile launch, as well data representing the orientation of the launch axis of a virtual-projectile launcher, may transmitted from peripheral device 32 to game device 16 in any suitable form. Examples include infrared, Bluetooth, etc.

Figure 5:
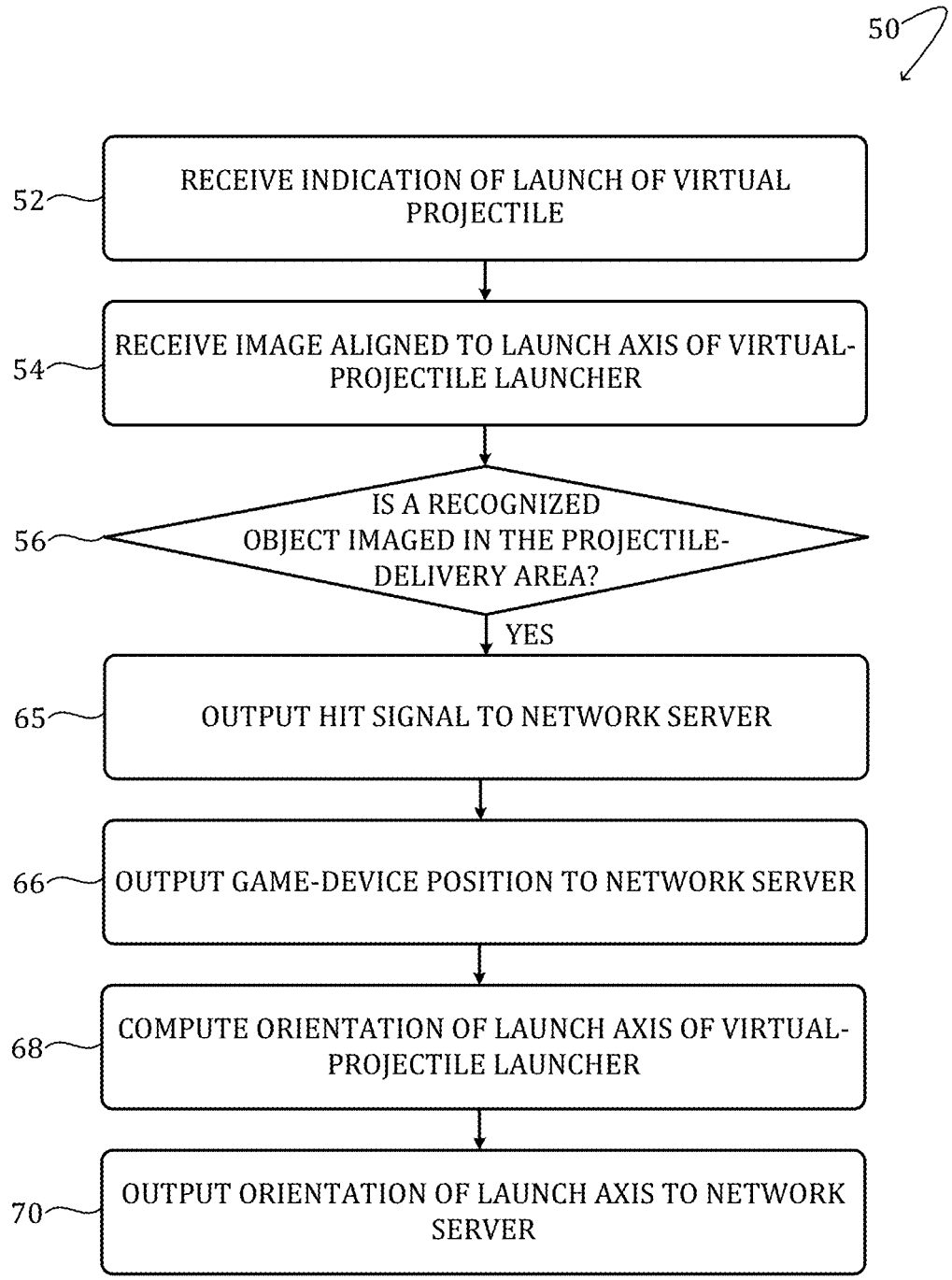
FIG. 5 shows aspects of an example client-side method supporting a game in which a virtual projectile is launched by a virtual-projectile launcher.

FIG. 5 shows aspects of an example method 50 supporting a game in which a virtual projectile is launched by a virtual-projectile launcher of a first player. Method 50 is enacted on a game device of a 'first' player—i.e., the game player launching the virtual projectile. The first player is one of a plurality of game players that also includes a 'second' game player. Method 50 is a client-side method that cooperates with a complementary server-side method, such as the method of FIG. 7. For ease of explanation, the methods herein are described with reference to the devices and configurations introduced hereinabove. It will be understood, however, that these methods may be used also with different devices and configurations.

At 52 of method 50, the game device receives an indication of launch of a virtual projectile by the virtual-projectile launcher of the first player. In examples where the virtual-projectile launcher is a peripheral device with a trigger or trigger function, the indication of launch may be transmitted by the peripheral device when the trigger or trigger function is actuated—e.g., as recognized by Hall-effect sensor or other switch. In other examples, the indication of launch may be sensed by a sensory component of the game device—e.g., a component configured to assess movement of the first player's hand or foot, interpret a spoken command, etc. A previously trained, machine learning model may be used, in some examples, to support voice recognition, gesture detection and/or other input functions.

At 54 the game device receives an image aligned to a launch axis of a virtual-projectile launcher of the first player. The image may be aligned in any predefined manner—e.g., aligned normal to, aligned obliquely to, aligned above, below, or askew. In examples where the virtual-projectile launcher is a peripheral device with a camera that acquires the image, and where the optical axis of the camera is parallel to the longitudinal launch axis of the peripheral device, the game device may receive that image from the peripheral device. In examples where the virtual-projectile launcher is a hand or foot of the first player, the game device may receive the image directly from the game-device camera. The latter example may include the application of a suitable heuristic rule relating image alignment to the launch axis—e.g., the launch axis and the optical axis of the game-device camera are both in the direction that the first player is facing.

At 56, pursuant to receiving the indication of launch at 52, the game device determines whether a recognized object is imaged in a projectile-delivery area of the image received at 54. The determination is made in an object-recognition engine operating on the game device—e.g., a previously trained, machine-learning engine.

Figure 6A:
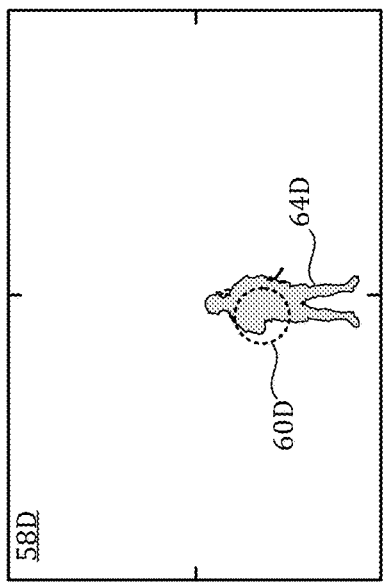
FIGS. 6A through 6E show aspects of example images including a projectile-delivery area.
Figure 6B:
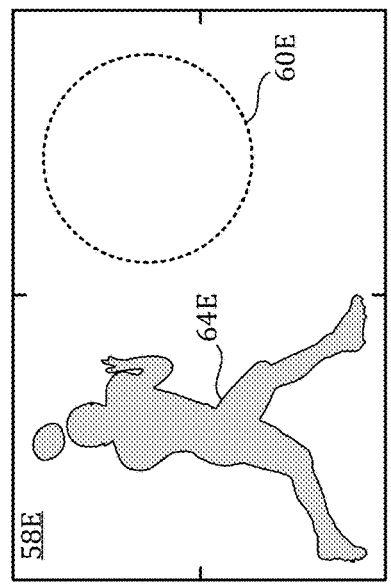

FIGS. 6A through 6E schematically illustrate example determinations made at 56 of method 50. FIG. 6A shows aspects of an example image 58A that could be acquired by peripheral-device camera 38. Image 58A includes a central projectile-delivery area 60A. The projectile-delivery area intersects an image of an unrecognized object 62. On processing image 58A pursuant to receiving the indication of launch, the game device determines that no recognized object is imaged in the projectile-delivery area. FIG. 6B shows aspects of another example image 58B that could be acquired by peripheral-device camera 38. In this image, a recognized object 64B is imaged in projectile-delivery area 60B. On processing image 58B pursuant to receiving the indication of launch, the game device determines that a recognized object is imaged in the projectile-delivery area and may further determine the class of that object—an opponent game player in the illustrated example.

Figure 6C:
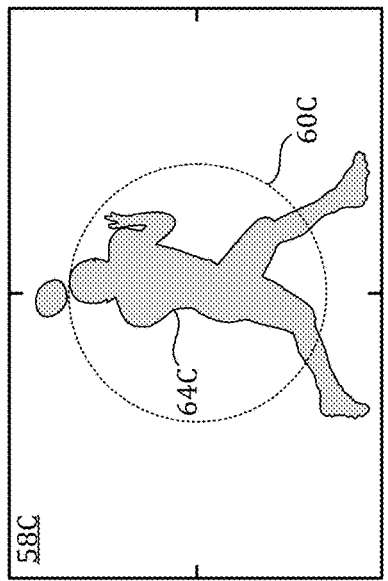

In the methods herein, the size of the projectile-delivery area may vary depending on the type of virtual projectile launched by the first player. The projectile-delivery area corresponding to a virtual bullet or wave packet may be small in comparison to the projectile area corresponding to a virtual shotgun slug. The projectile-delivery area corresponding to a virtual football may be much larger, inasmuch as a competent receiver may reach out over a wide catch radius to receive a football launched in his or her direction. That aspect is illustrated in FIG. 6C, where image 58C includes recognized object 64C and projectile-delivery area 60C.

Figure 6D:
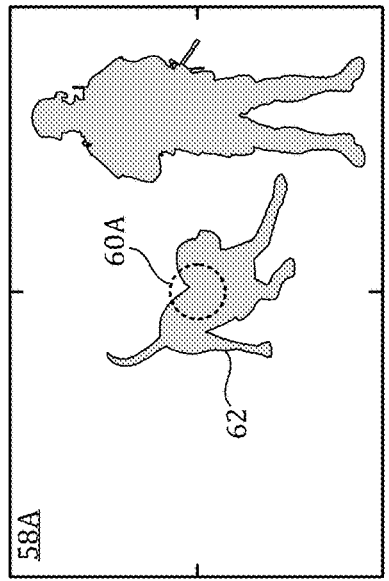

The central elevation of the projectile-delivery area in images 58A through 58C is appropriate for scenarios in which the virtual projectile is little affected by gravity en route to its target. That condition may be satisfied when the velocity of the virtual projectile is relatively great or the target is relatively close to the virtual-projectile launcher. In scenarios that fail to meet either condition, the projectile-delivery area may be lowered from a default central elevation to account for the effect of gravity on the virtual projectile. That aspect is illustrated in FIG. 6D, where projectile-delivery area 60D is relatively low in image 58D and intersects recognized object 64D. In some examples, the projectile-delivery area may be lowered by an amount that increases with increasing estimated distance to the target. In some examples, the distance to the target may be estimated via range-sensing componentry on the game device or on a communicatively coupled peripheral device. In some examples, the distance to the target may be estimated by the game player and provided as input to the game device—e.g., as a spoken parameter value recognized via a voice-recognition engine of the game device.

In games in which the initial velocity of the virtual projectile is variable, the projectile-delivery area may be lowered by an amount that decreases with increasing initial velocity of the virtual projectile. Examples include games in which the virtual-projectile launcher is a hand, foot, or passive sports implement of the first player. Here, the initial velocity may be computed based on inertial data from a peripheral device worn on the wrist or ankle of the first player.

Figure 6E:
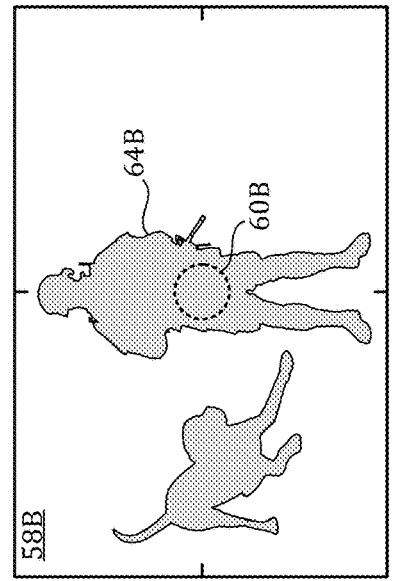

The central lateral position of the projectile-delivery area in images 58A through 58D is appropriate when the velocity of the virtual projectile is much greater than the velocity of the target or when the target is relatively close to the virtual-projectile launcher. In scenarios that fail to meet either condition, the projectile-delivery area may be shifted laterally from a default central lateral position to account for movement of the target while the virtual projectile is in flight. That aspect is illustrated in FIG. 6E, where projectile-delivery area 60E is laterally shifted in image 58E and does not intersect recognized object 64E at the time of image acquisition (i.e., launch of the virtual projectile). In some examples, the projectile-delivery area may be shifted in the direction of movement of the target by an amount that increases with increasing velocity of the target and/or increasing time of flight. In some examples, a sequence of images may be acquired at known intervals and the velocity of the target moving through the image may be estimated by the image-processing engine of the game device. As this disclosure embraces every combination and subcombination of the examples here described, velocity-based lateral shifting of the projectile-delivery area may be applied in combination with estimation of the initial velocity of the virtual projectile, as described hereinabove. In examples where the kinematics of the virtual projectile and/or target players is significant, the image-processing engine of the game device may include a kinematics engine configured to enact the required kinematic computations. In examples in which the first player's game device comprises an augmented-reality display device, a virtual reticle or other graphic may be superposed onto the first player's field of view, to indicate the position and/or size of the projectile-delivery area.

Returning now to FIG. 5, at 65 of method 50 the game device outputs a hit signal to a network server on determining, at 56, that a recognized object is imaged in the projectile-delivery area of the image. The hit signal indicates that a recognized object has received the virtual projectile launched by the first player and, in some examples, may further indicate the class of object that has received the virtual projectile. However, the hit signal need not uniquely identify the receiver of the virtual projectile. For that determination, method 50 may leverage cooperative server-side processing, as described by example in the context of FIG. 7.

To support the server-side processing, the game device, at 66, outputs its position to a network server. The position may include translational coordinates of the game device—e.g., horizontal X and Y coordinates and an optional Z coordinate where appropriate. In some examples, the position may include GPS coordinates of the game device. In other examples, the position of the game device may be computed based on one or more reference images acquired by a game-device camera, using SLAM, or in any other suitable manner.

At 68 the orientation of the launch axis of the virtual-projectile launcher is computed. The orientation may include rotational coordinates of the launch axis—e.g., elevation and azimuth angles. In examples where the virtual-projectile launcher is a peripheral device, the orientation of the launch axis may be computed based on inertial and/or magnetic data sensed on the peripheral device and transmitted to the game device. Alternatively, the orientation of the launch axis may be computed based on one or more reference images acquired by a peripheral-device or game-device camera—e.g., using SLAM.

In examples where the virtual-projectile launcher is a hand, foot, or passive implement of the first player, the orientation of the launch access may be computed differently. In some examples, the orientation of the launch axis, as well as the initial velocity of the virtual projectile, may be computed based on inertial data from a peripheral device worn on the wrist or ankle of the first player. In examples in which inertial data is not available, a heuristic rule and/or previously trained machine learning model may be used to determine the orientation of the launch axis, as noted above. At 70 the game device outputs the orientation of the launch axis of the virtual-projectile launcher to the network server.

Figure 7:
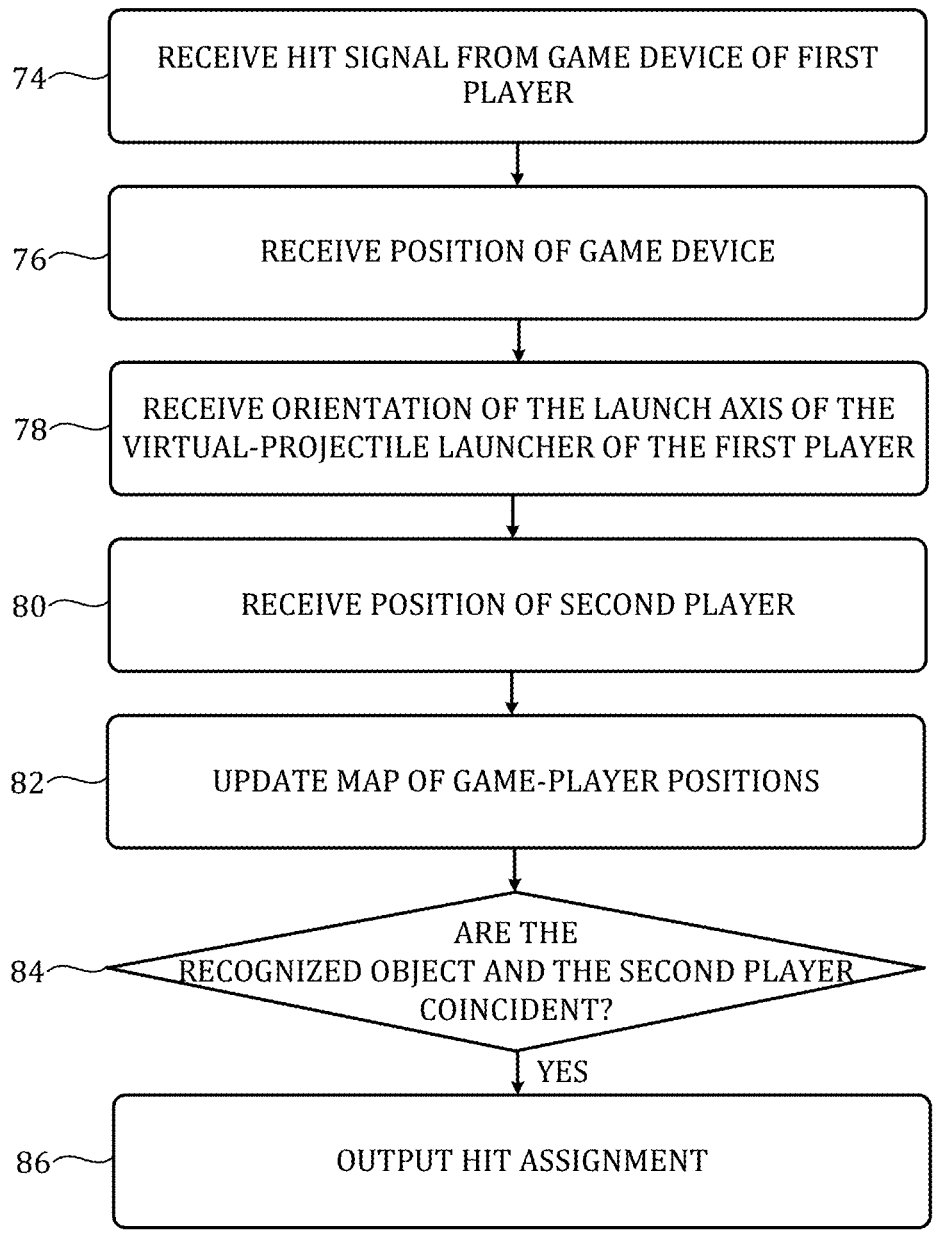
FIG. 7 shows aspects of an example server-side method supporting a game in which a virtual projectile is launched by a virtual-projectile launcher.

FIG. 7 shows aspects of an example method 72 supporting a game in which a virtual projectile is launched by a virtual-projectile launcher of a first player. Method 72 may be enacted on a network server communicatively coupled to one or more game devices of the game players. Method 72 is a server-side method that cooperates with a complementary client-side method, such as the method of FIG. 5.

At 74 of method 72, the network server receives a hit signal from the game device of the first player. As described in the context of FIG. 5, the game device of the first player is configured to output the hit signal on determining, pursuant to receiving an indication of launch of the virtual projectile, that a recognized object is imaged in a projectile-delivery area of an image received by the game device.

At 76 the network server receives the position of the game device of the first player. The position may include translational coordinates of the game device—e.g., horizontal X and Y coordinates and an optional Z coordinate. as noted above. At 78 the network server receives an orientation of the launch axis of the virtual-projectile launcher of the first player. The orientation may include rotational coordinates of the launch axis—e.g., elevation and azimuth angles, as noted above. The position and orientation may be received from the first player's game device, as noted previously, or from any available player-mapping service.

At 80 the network server receives a position of a second player. In some examples, the position of the second player may comprise translational coordinates of a game device of the second player, which is received from the game device of the second player. The network server may receive, in that manner or otherwise, the positions of any, some, or all of the players participating in the game. At 82 the network server updates a map of game-player position for each of the plurality of tracked game players. In some examples, optionally, the map may include vector-valued velocities of each of the game players.

At 84 the network sever determines, pursuant to receiving the hit signal, whether the recognized object and the second player are coincident at the time of launch of the virtual projectile. To make that determination, a mapping engine operating on the network server may compute the trajectory of the virtual projectile based on the position of the first player (received at 76) and the orientation of the launch axis (received at 78). The mapping engine may trace the computed trajectory from the position of the first player to the nearest intersection with any of the other game players. The game player located at the nearest intersection is then assigned as the player receiving the virtual projectile. In games where the player positions are updated at relatively frequent intervals, and where the virtual projectile travels much faster than any player, the determination at 84 can be made independent of the velocities of the players. In games where either condition is not met, the determination at 84 may be further informed by an estimate of the player velocities, as determined optionally at 82.

At 86 the network server outputs a hit assignment. In some examples, the hit assignment may be output to the game device of the projectile-launching first player and/or the game device of the projectile-receiving second player. More generally, the hit assignment may be used in any manner supportive of the game experience. The hit assignment may signal that the hit player is down, has reduced abilities or life points, has a disabled vehicle or weapon, has possession of a game ball, has advanced toward a goal line, etc.

No aspect of the foregoing methods or configurations should be understood in a limiting sense, because numerous extensions, omissions, and variations are also envisaged. For instance, although object recognition may be enacted on individual game devices 16, as described above, network service 40 may provide alternative or supplementary object recognition in some examples. Similarly, location sensing of at least some of the game players or other targets may be a function of the network service, in whole or in part. To that end, the network service may comprise suitable (e.g., eye-in-the-sky) imaging capability. In sports games, the network service may be configured to recognize physical game boundaries, such as sidelines, goal posts, etc.

The methods herein may be tied to a computer system of one or more computing devices. Such methods and processes may be implemented as an application program or service, an application programming interface (API), a library, and/or other computer-program product.

Figure 8:
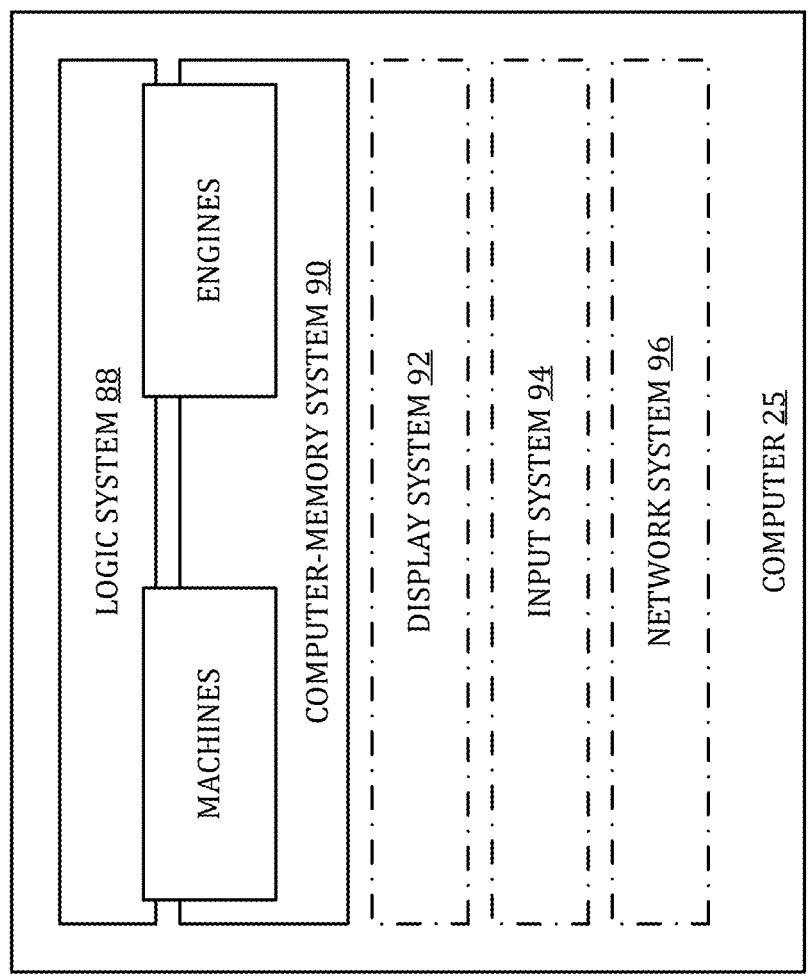
FIG. 8 shows aspects of an example computer system.

FIG. 8 provides a schematic representation of a computer 25 configured to provide some or all of the computer system functionality disclosed herein. Computer 25 may take the form of a personal computer, application-server computer, or any other computing device.

Computer 25 includes a logic system 88 and a computer-memory system 90. Computer 25 may optionally include a display system 92, an input system 94, a network system 96, and/or other systems not shown in the drawings.

Logic system 88 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 90 includes at least one physical device configured to temporarily and/or permanently hold computer system information, such as data and instructions executable by logic system 88. When the computer-memory system includes two or more devices, the devices may be collocated or remotely located. Computer-memory system 90 may include at least one volatile, nonvolatile, dynamic, static, read/write, read-only, random-access, sequential-access, location-addressable, file-addressable, and/or content-addressable computer-memory device. Computer-memory system 90 may include at least one removable and/or built-in computer-memory device. When the logic system executes instructions, the state of computer-memory system 90 may be transformed—e.g., to hold different data.

Aspects of logic system 88 and computer-memory system 90 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 88 and computer-memory system 90 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 92 may be used to present a visual representation of data held by computer-memory system 90. The visual representation may take the form of a graphical user interface (GUI) in some examples. The display system may include one or more display devices utilizing virtually any type of technology. In some implementations, display system may include one or more virtual-,augmented-, or mixed reality displays.

When included, input system 94 may comprise or interface with one or more input devices. An input device may include a sensor device or a user input device. Examples of user input devices include a keyboard, mouse, or touch screen.

When included, network system 96 may be configured to communicatively couple computer 25 with one or more other computer. The network system may include wired and/or wireless communication devices compatible with one or more different communication protocols. The network system may be configured for communication via personal-, local- and/or wide-area networks.

This disclosure is presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

One aspect of this disclosure is directed to a method enacted on a device worn by a first player. The method comprises: receiving an indication of launch of a virtual projectile by a virtual-projectile launcher of the first player; receiving an image aligned to a launch axis of the virtual-projectile launcher; outputting a hit signal to a server on determining, pursuant to receiving the indication of launch, that a recognized object is imaged in a projectile-delivery area of the image; outputting a position of the device to the server; and outputting an orientation of the launch axis to the server, the server being configured to receive a position of a second player and output a hit assignment if the recognized object and the second player are coincident at the indicated launch of the virtual projectile.

In some implementations, the device includes a head-worn display device. In some implementations, the first and second players are among a plurality of players participating in a game. In some implementations, the virtual-projectile launcher is communicatively coupled to the device and includes a rigidly mounted camera. In some implementations, the image comprises a reticle image and the virtual-projectile launcher includes a camera configured to acquire the image and a transmitter configured to transmit the image to the device. In some implementations, the camera includes a thermal-imaging camera. In some implementations, the launch axis is a longitudinal axis of the virtual-projectile launcher. In some implementations, the virtual-projectile launcher includes a trigger and a transmitter configured to transmit the indication of launch pursuant to actuation of the trigger. In some implementations, the virtual-projectile launcher is a hand or foot of the first player or a passive implement used by the first player. In some implementations, the recognized object includes a human being. In some implementations, the method further comprises determining, in a previously trained machine-learning engine operating on the device, whether the recognized object is imaged in the projectile-delivery area of the image. In some implementations, the position includes global positioning-system (GPS) coordinates. In some implementations, the method further comprises computing the orientation of the launch axis based on inertial and/or magnetic data sensed on the virtual-projectile launcher and received by the device. In some implementations, the position of the device and/or the orientation of the launch axis are computed based on one or more reference images acquired by a camera arranged on the device.

Another aspect of this disclosure is directed to a method enacted on a server to support an experience wherein a virtual projectile is launched by a virtual-projectile launcher of a first player. The method comprises: receiving a hit signal from a device worn by the first player, the device being configured to output the hit signal on determining, pursuant to receiving an indication of launch of the virtual projectile, that a recognized object is imaged in a projectile-delivery area; receiving a position of the device; receiving an orientation of a launch axis of the virtual-projectile launcher; receiving a position of a second player; and outputting a hit assignment on determining, pursuant to receiving the hit signal, that the recognized object and the second player are coincident at the indicated launch of the virtual projectile.

In some implementations, the server includes one or more of a cloud server or an edge server. In some implementations, the first player and the second player are among a plurality of players in an outdoor gaming experience, the method further comprising updating a map of player location for each of the plurality of players pursuant to receiving the position of the device and the position of the second player. In some implementations, the server includes a distributed server executing in parallel on devices worn by the plurality of players. In some implementations, outputting the hit assignment includes outputting to one or both of the first player and the second player.

Another aspect of this disclosure is directed to a device to be worn by a first player, the device comprising a computer coupled operatively to a wireless transmitter and wireless receiver and configured to: receive an indication of launch of a virtual projectile by a virtual-projectile launcher of the first player, receive an image aligned to a launch axis of the virtual-projectile launcher, determine whether a recognized object is imaged in a projectile-delivery area of the image, output a hit signal to a server on determining, pursuant to receiving the indication of launch, that the recognized object is imaged in the projectile-delivery area of the image, output a position of the device to the server, and output an orientation of the launch axis to the server, the server being configured to receive a position of a second player and output a hit assignment if the recognized object and the second player are coincident at the indicated launch of the virtual projectile.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted on a device worn by a first player, a method comprising:
   receiving an indication of launch of a virtual projectile by a virtual-projectile launcher of the first player;
   receiving an image aligned to a launch axis of the virtual-projectile launcher;
   outputting a hit signal to a server on determining, pursuant to receiving the indication of launch, that a recognized object is imaged in a projectile-delivery area of the image;
   outputting a position of the device to the server; and
   outputting an orientation of the launch axis to the server, the server being configured to receive a position of a second player and output a hit assignment if the recognized object and the second player are coincident at the indicated launch of the virtual projectile.

2. The method of claim 1 wherein the device includes a head-worn display device.

3. The method of claim 1 wherein the first and second players are among a plurality of players participating in a game.

4. The method of claim 1 wherein the virtual-projectile launcher is communicatively coupled to the device and includes a rigidly mounted camera.

5. The method of claim 1 wherein the image comprises a reticle image, wherein the virtual-projectile launcher includes a camera configured to acquire the image and a transmitter configured to transmit the image to the device.

6. The method of claim 5 wherein the camera includes a thermal-imaging camera.

7. The method of claim 1 wherein the launch axis is a longitudinal axis of the virtual-projectile launcher.

8. The method of claim 1 wherein the virtual-projectile launcher includes a trigger and a transmitter configured to transmit the indication of launch pursuant to actuation of the trigger.

9. The method of claim 1 wherein the virtual-projectile launcher is a hand or foot of the first player or a passive implement used by the first player.

10. The method of claim 1 wherein the recognized object includes a human being.

11. The method of claim 1 further comprising determining, in a previously trained machine-learning engine operating on the device, whether the recognized object is imaged in the projectile-delivery area of the image.

12. The method of claim 1 wherein the position includes global positioning-system (GPS) coordinates.

13. The method of claim 1 further comprising computing the orientation of the launch axis based on inertial and/or magnetic data sensed on the virtual-projectile launcher and received by the device.

14. The method of claim 1 wherein the position of the device and/or the orientation of the launch axis are computed based on one or more reference images acquired by a camera arranged on the device.

15. A method enacted on a server to support an experience wherein a virtual projectile is launched by a virtual-projectile launcher of a first player, the method comprising:
   receiving a hit signal from a device worn by the first player, the device being configured to output the hit signal on determining, pursuant to receiving an indication of launch of the virtual projectile, that a recognized object is imaged in a projectile-delivery area;
   receiving a position of the device;
   receiving an orientation of a launch axis of the virtual-projectile launcher;
   receiving a position of a second player; and
   outputting a hit assignment on determining, pursuant to receiving the hit signal, that the recognized object and the second player are coincident at the indicated launch of the virtual projectile.

16. The method of claim 15 wherein the server includes one or more of a cloud server or an edge server.

17. The method of claim 15 wherein the first player and the second player are among a plurality of players in an outdoor gaming experience, the method further comprising updating a map of player location for each of the plurality of players pursuant to receiving the position of the device and the position of the second player.

18. The method of claim 17 wherein the server includes a distributed server executing in parallel on devices worn by the plurality of players.

19. The method of claim 15 wherein outputting the hit assignment includes outputting to one or both of the first player and the second player.

20. A device to be worn by a first player, the device comprising:
  a computer coupled operatively to a wireless transmitter and wireless receiver and configured to:
    receive an indication of launch of a virtual projectile by a virtual-projectile launcher of the first player,
    receive an image aligned to a launch axis of the virtual-projectile launcher,
    determine whether a recognized object is imaged in a projectile-delivery area of the image,
    output a hit signal to a server on determining, pursuant to receiving the indication of launch, that the recognized object is imaged in the projectile-delivery area of the image,
    output a position of the device to the server, and
    output an orientation of the launch axis to the server, the server being configured to receive a position of a second player and output a hit assignment if the recognized object and the second player are coincident at the indicated launch of the virtual projectile.

* * * * *